Patented Jan. 3, 1939

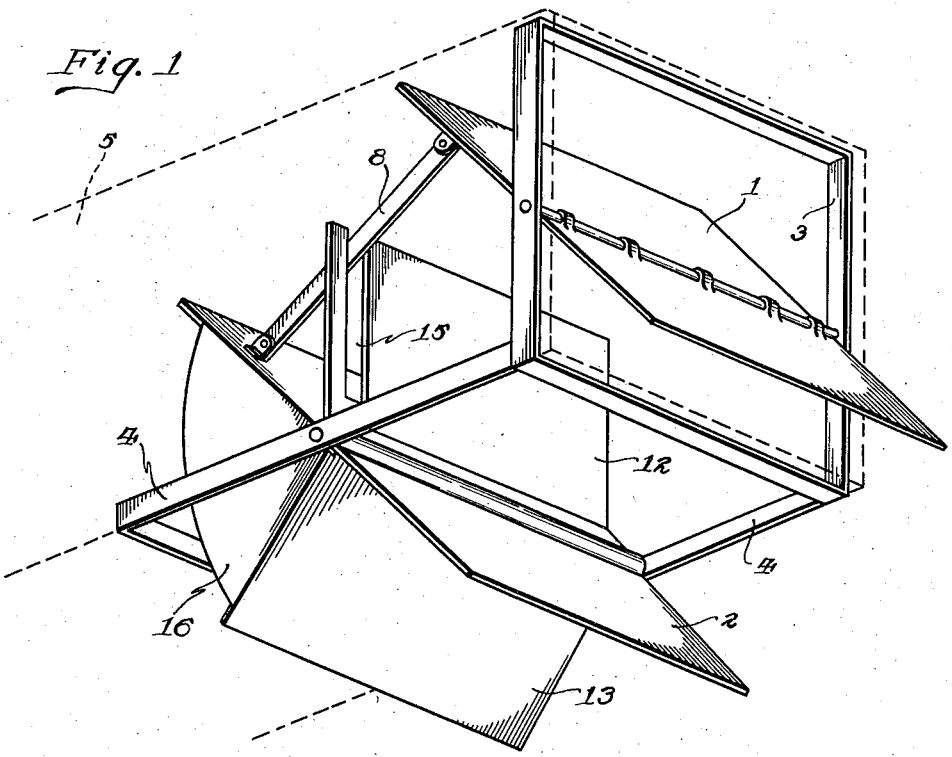
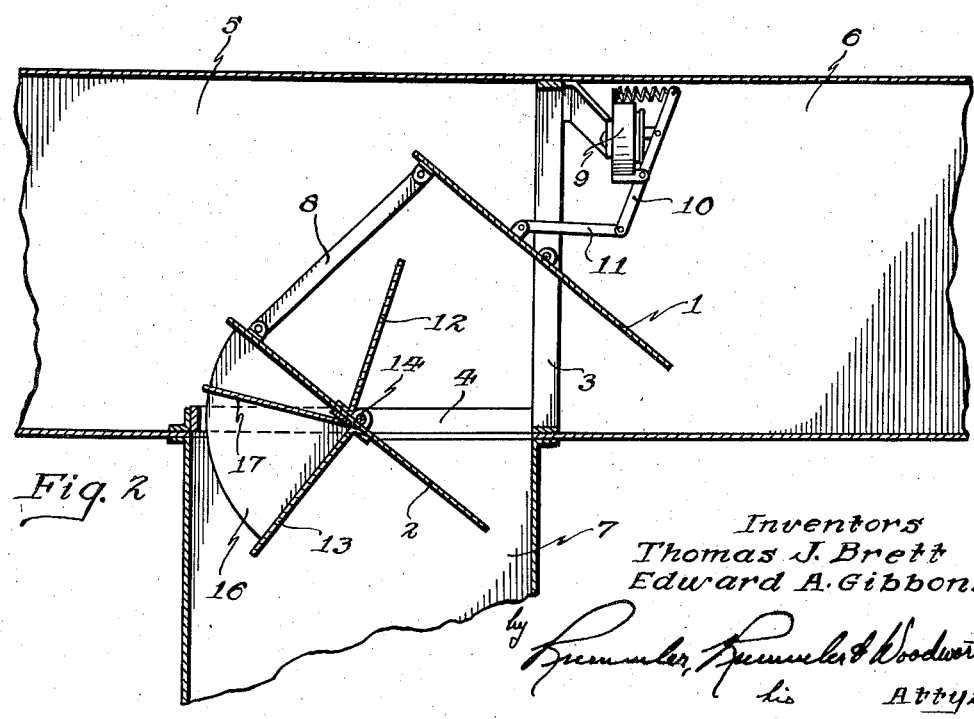

2,142,665

UNITED STATES PATENT OFFICE 2,142,665

VOLUME AND VELOCITY CONTROL DAMPER

Thomas J. Brett and Edward A. Gibbons, Chicago, Ill.

Application May 13, 1936, Serial No. 79,595

12 Claims. (Cl. 236—13)

This invention relates to mixing dampers for air ducts and particularly to an improved damper combination and construction for affording automatic control of the volume and velocity of air delivered to occupied spaces for temperature regulation and ventilation therein.

Generally the air delivered to occupied spaces for ventilation and temperature regulation purposes is prepared by mixing warm or heated air with cool or tempered, fresh or recirculated air; and such mixing is accomplished by means of mixing dampers positioned at the intersection of the separate ducts conducting the warm air and the cool air respectively or at the respective warm air and cool air inlets of the common duct leading to the occupied spaces. These dampers are ordinarily disposed at right-angles to each other and interconnected to operate substantially in parallel, whereby when one inlet is opened, the other inlet is closed. The dampers are actuated by a suitable motor under the control of a thermostat, subject to the temperature of the mixed air or the air in the occupied spaces.

During such regulation of the mixed air, the usual mixing dampers will operate to extreme and intermediate positions in response to the thermostatic control with the result that there is considerable variation of velocity, density and temperature of the air as it is delivered to the occupied spaces and such conditions are found to cause rapid fluctuation in the temperature of the occupied spaces with a resultant lack of comfort on the part of the occupants.

It has also been found that, with the ordinary double-bladed mixing damper arrangement, there is stratification of the warm and cool air in the delivery duct and as a result drafts are created in the occupied spaces and improper distribution is had, due to high velocity and variation of the air flow delivered to occupied spaces.

It is to cure these difficulties through a more positive and efficient control of the cool or tempered air taken into the delivery duct that the present invention has been devised.

The main objects of this invention are to provide an improved damper combination that will more positively and uniformly control the mixture of warm and tempered air for distribution to occupied spaces; to provide such a damper combination that will control the velocity as well as the volume of the mixed air; to provide such a damper combination that will more positively and effectively mix the warm and tempered air as the respective air columns are united in the distribution duct; to provide an improved damper construction that will cause the mixing of warm and tempered air columns without stratification and with more positive control of the air velocity in the distribution duct; to provide such a construction that may be readily adjusted to establish proper volume and velocity conditions for each individual application; and to provide such a device of simple construction and low manufacturing cost.

A specific embodiment of this invention is shown in the accompanying drawing in which:

Figure 1 is a perspective view showing the improved damper construction and arrangement, the distribution duct being indicated by dotted outline, and Fig. 2 is a sectional view showing the damper arrangement and its application at the junction of a warm air duct and a tempered air duct.

In the form shown in the drawing, our invention comprises a pair of mixing dampers of the balanced or butterfly type arranged and mounted in the usual manner on respectively parallel central or medial axes and a pair of supplemental damper blades mounted respectively on each face of the cool or tempered air damper parallel with the axis thereof and arranged to project outwardly therefrom. The expression "balanced or butterfly type" is intended to mean that the damper blade extends in opposite directions an equal distance on each side of its pivotal axis.

The primary mixing damper blades 1 and 2 are pivotally mounted on parallel axes in a pair of rectangular frames 3 and 4 respectively which in turn are mounted at right angles to each other in end and side inlet openings into a common distribution duct 5 which leads to the space to which air is to be delivered. In the arrangement shown these inlets are at the junction or intersection of a warm or heated air duct 6 and a cool or tempered air duct 7, the dampers 1 and 2 being arranged to control the passages from the ducts 6 and 7 respectively, and being interconnected in the usual manner by a link 8 whereby they may be simultaneously actuated in parallel relationship by a motor 9 connected, by means of an arm 10 and link 11, to one of the damper blades. The motor 9 is mounted in the usual manner on a suitable bracket connected to the frame of the damper to which it is connected.

The motor 9 as shown is of the compressed air operated type, and is actuated in response to a thermostat or temperature regulator, not shown, remotely located at a suitable point where it will be responsive to the temperature of the mixed air either in the delivery duct or at some suitable point in the space to which the air is delivered. Thus, in response to the thermostat the motor 9 will actuate the damper blades 1 and 2 so that they in turn will vary the proportions of the warm or heated air and the cool or temperate air taken into the delivery duct 5, the blades 1 and 2 because of their parallel mounting and operation serving to close one of the ducts 6 and 7 while opening the other or vice versa.

In order to accomplish the purposes of this invention the tool or temperate air damper blade 2 is provided with a pair of supplemental or secondary blades 12 and 13 mounted on its inner and outer faces respectively. Each of the supplemental blades is mounted parallel with and adjacent the axis 14 of the blade 2, and in the form shown extends from side to side thereof, being arranged to project outwardly from the respective faces of the blade 2 so that the planes in which they lie will intersect the plane of the blade 2. Also each of the supplemental blades 12 and 13 is of an area substantially equal to one-half the area of the damper blade face upon which it is mounted.

Each of the supplemental blades 12 and 13 is secured onto the blade 2 by means of rivets, sheet metal screws, welding or any other suitable rigid fastening means and a flange or its equivalent is provided on the fixed edge of the supplemental blades for this purpose. The supplemental blades are each also arranged so as to be adjustable, as by bending the blade at or adjacent to its fixed edge, to vary the angle of intersection between its plane and the plane of the damper blade 2. Thus each blade may be adjusted and set to a predetermined position or angle relative to the face of the blade 2 as will be hereafter described.

As shown the supplemental blade 12 mounted on the inner face of the blade 2 is provided with a slot 15 through which the connecting link 8 may move during shifting of the primary dampers 1 and 2. Also the supplemental blade 13, mounted on the outer face of the blade 2, is provided with a pair of side pieces or wing members 16 which are quadrant-shaped and extend from its side edges inwardly toward the respective side edges of the damper blade 2 on the half portion thereof that moves into the distribution duct 5 in the direction of air flow as the blade 2 is shifted to open the inlet from the cool air duct 7. As shown the side pieces or wing members 16 are in the shape of circular sectors and extend from the face of the blade 2 to substantially the end edge of the blade 13, and are preferably formed as an integral part of the blade 13.

The function of the wing members 16 is mainly to prevent the flow of air around the side edges of the supplemental blade 13 and the same result is had with regard to the side edges of the blade 2 to which the wing members 16 extend. Thus, the air is forced to flow over the outer end edges or tips of the blades where the mixing can be positively and more efficiently controlled and short-circuiting of the air, which has a tendency to produce stratification, is obviated. The advantage of the wing members 16 is particularly important and apparent when the mixing damper blades 1 and 2 are operating to throttle the heated air from the duct 6 and increase the proportion of the cool or tempered air from the duct 7.

Our improved mixing damper construction may be made of any material suitable to withstand buckling or a tendency to vibrate under the action of rapidly moving air columns, and the supplemental blades are preferably made of a material that can be readily bent manually to adjust their position relative to the damper blade 2 and at the same time to hold the set or position to which they have been adjusted. It will be understood however, that any suitable arrangement to provide the desired adjustability may be employed.

In operation the primary damper blades 1 and 2 will pivot on their respective axes in the usual manner to open and close the respective inlets in which they are mounted, the blades operating in parallel so that as one inlet is being opened the other inlet will be closed to thus vary the proportions of air admitted through each inlet. The supplemental damper blades 12 and 13 projecting outwardly from the respective faces of the damper blade 2 serve to reduce the effective opening or air passage through the cool or temperate air inlet and around the primary blade 2, thus providing a means by which the volume of cool or tempered air admitted to the distribution duct 5 may be more accurately controlled with respect to the volume of the warm or heated air entering the duct 5.

Primarily the usual mixing dampers exert substantially no influence on the volume of air delivered from the distribution duct, but rather serve to control the temperature of the delivered air through regulation of the relative quantities of warm and cool air mixed to provide the air for delivery. However, it is found that with the warm air volume damper wide open a considerably smaller actual volume of air is delivered than is the case when the cool air volume damper is wide open. This difference in delivered volumes is due to differences in the densities of the heated and cooler air, as well as to the resistance of the heaters on the warm air side that are not present on the cool air side, and results in variations in air velocities at the discharge end of the distribution duct that in many cases cause drafts and too rapid temperature changes in the occupied spaces that can not properly be controlled, by the thermostat affecting actuation of the mixing dampers, without the aid of secondary controlling means such as the supplemental dampers herein described.

To determine the proper adjustment or setting of the secondary or supplemental damper blades relative to the primary cool air damper the secondary blades are first set at such an angle that they will reduce the full open area of the primary damper by substantially one-half, the two supplemental dampers being at approximately the same angle relative to the face of the primary damper. This adjustment may be accomplished from the air chambers or through small doors, not shown, ordinarily provided in the side of the ducts adjacent the damper mounting.

Velocity readings are then taken, by means of an anemometer or otherwise, at the discharge end of the distribution duct and the secondary dampers given further adjustment until the average discharge velocity with the cool air dampers in extreme open position is equal to or slightly less than the average velocity had with the cool air damper closed and the hot air damper wide open.

Final adjustment and permanent setting of the supplemental dampers is then made by observation of the occupied spaces for draft and odor conditions, the position of the secondary blades being shifted until satisfactory air distribution and condition for comfortable and healthful occupancy is attained. Odor conditions are corrected by increasing the proportion of cool air admitted and draft conditions are corrected through adjustment of the secondary blades to reduce the volume of cool air passing the same.

In this manner a more thorough mixing of the cool and hot air is obtained, and stratification of the hot and cool air in the distribution duct is substantially obviated, thereby providing a more uniform temperature in the discharged air and more accurate and steady control by the regulating thermostat.

The reason for such more efficient mixing action of the improved dampers is apparent from Figure 2 of the drawing which shows the dampers in a more or less average position. It will be seen that warm air from the duct 6 passing the lower edge or blade 1 is baffled by the supplemental blade 12 immediately as it joins with the column of cool air from the duct 7 which passes the lower edge of the blade 2, thus creating a turbulence resulting in a thorough mixing. The column of mixed air is then forced sharply upward over the tip of the blade 12 and into the column of air passing over the top edge of the blade 1, causing intermixture of the air columns at the top of the delivery duct 5 and a downward deflection of this mixture from the top of the duct 5 into the column of cool air passing from the duct 7 over the edge of the blade 13. This last-mentioned column of cool air is directed in an obliquely upward direction by the lower face of the upper half of the blade 2, crosswise of the downwardly deflected air from the top of the duct 5, with the result that all of the air in the delivery duct 5 is thoroughly mixed and a condition of average temperature and density occurs.

The air in the duct 5 is properly mixed by the thermo and mechanical action of the air as its temperature changes, together with the turbulence of the air caused by the supplemental damper blades changing the direction of air flow, so that stratification of the warm and cool air in duct 5 is positively prevented.

In many cases, where the temperature of the cool air is very low relative to the temperature of the warm or hot air, an additional secondary or supplemental damper on the entering sides of the cold air damper is necessary to further reduce the volume of cool air entering the distribution duct 5 when the primary dampers are first shifted, from the position of full opening for the hot air duct, toward an intermediate position.

Such a third supplemental damper blade is indicated at 17 in Fig. 2 and is disposed intermediate the blade 13 and inwardly moving portion of the primary blade 2. The blade 17 is set at such an angle with the primary blade that at the first practically all the entering cool air must pass around the blade 12. Thus stratification is obviated as well as a too rapid drop in delivery temperature. This third blade may or may not be employed and its use is determined by the circumstances of the particular installation.

Once the supplemental or secondary dampers controlling the air supplied to any particular occupied space are properly adjusted and set no further adjustment is necessary and proper air control and distribution will always be had.

Although but one specific embodiment of this invention is herein shown and described it will be understood that details of the structure shown may be altered or omitted without departing from the spirit of this invention as defined by the following claims.

We claim:

1. The combination with a pair of mixing dampers each being pivoted on an axis parallel with and intermediate its end edges and each being arranged to control a respective inlet to a common duct, said inlets being each subject to a different fluid pressure of a supplemental damper blade mounted on a face of the damper subject to the greater pressure and adjacent and parallel with the axis thereof, said supplemental damper blade being in a plane intersecting the plane of the damper upon which it is mounted.

2. The combination with a pair of mixing dampers positioned at the intersection of a pair of ducts having different fluid pressure therein and each arranged to control one of said ducts respectively, each of said dampers being pivoted on an axis parallel with and intermediate its end edges, of a supplemental damper blade mounted on a face of the damper subject to the greater pressure and adjacent and parallel with the axis thereof, said supplemental damper blade being in a plane intersecting the plane of the damper upon which it is mounted and adjustable to vary the angle of intersection between the said planes.

3. The combination with a pair of mixing dampers interconnected to operate simultaneously and each arranged to control a respective inlet to a common duct, each of said inlets being subject to a different fluid pressure and each of said dampers being balanced on a central axis, of a supplemental damper blade mounted on a face of the damper subject to the greater pressure and parallel with the axis thereof, said supplemental damper blade being in a plane intersecting the plane of the damper upon which it is mounted and adjustable to vary the angle of intersection between the said planes.

4. The combination with a pair of mixing dampers each arranged to control a respective inlet to a common duct, each of said inlets being subject to a different fluid pressure and each of said dampers being balanced on a central axis, of a supplemental damper blade mounted on the outer face of the damper subject to the greater pressure and parallel with the axis thereof, said supplemental damper blade being in a plane intersecting the plane of the damper upon which it is mounted and having a wing member extending from each side edge to the respectively adjacent side edge of the last mentioned damper which moves into said common duct when said last mentioned damper opens.

5. The combination with a pair of mixing dampers each arranged to control a respective inlet to a common duct, each of said inlets being subject to a different fluid pressure and each of said dampers being balanced on a central axis, of a supplemental damper blade mounted on each face of the damper subject to the greater pressure and parallel with the axis thereof, each of said supplemental damper blades being in a plane intersecting the plane of the damper upon which it is mounted.

6. The combination with a pair of mixing dampers each arranged to control a respective inlet to a common duct, each of said inlets being subject to a different fluid pressure and each of said dampers being balanced on a central axis, of a supplemental damper blade mounted on each face of the damper subject to the greater pressure and parallel with the axis thereof, each of said supplemental damper blades being in a plane intersecting the plane of the damper upon which it is mounted and independently adjustable to vary the angle of intersection between said planes respectively.

7. The combination with a pair of mixing dampers interconnected for simultaneous operation and arranged to respectively control a horizontally entering warm air inlet and an adjacent upwardly discharging cool air inlet of a common duct, of a supplemental damper blade mounted on each face of the cool air inlet damper adjacent and parallel with the axis thereof, each of said supplemental blades being in a plane intersecting the plane of said cool air inlet damper.

8. A device of the class described comprising a pair of dampers interconnected for simultaneous operation and each arranged to control a respective inlet to a common duct, said dampers each being balanced on a central axis and arranged to operate to close one of said inlets when the other is opened, and said inlets receiving air at respectively different velocity pressures, means to operate said dampers, and a supplemental damper blade mounted parallel with the axis of and on a face of the one of said dampers subject to the greatest velocity pressure, said supplemental blade being in a plane intersecting the plane of the damper upon which it is mounted.

9. A device of the class described comprising a pair of dampers interconnected for simultaneous operation and each arranged to control a respective inlet to a common duct, said dampers each being balanced on a central axis and arranged to operate to close one of said inlets when the other is opened, and said inlets receiving air at respectively different velocity pressures, means to operate said dampers, and a supplemental damper blade mounted parallel with the axis of and on a face of the one of said dampers subject to the greatest velocity pressure, said supplemental blade being in a plane intersecting the plane of the damper upon which it is mounted and adjustable to vary the angle of intersection of said planes.

10. A device of the class described comprising a pair of dampers interconnected for simultaneous operation and each arranged to control a respective inlet to a common duct, said dampers each being balanced on a central axis and arranged to close one of said inlets when the other is opened, and said inlets receiving air at respectively different velocity pressures, means to operate said dampers, and a supplemental damper blade mounted parallel with the axis of and on each face of the one of said dampers subject to the greatest velocity pressure, said supplemental dampers each being in a plane intersecting the plane of the damper upon which it is mounted.

11. A pair of mixing dampers interconnected for simultaneous operation and arranged to control respectively a warm air inlet and a cool air inlet of a common duct, the velocity of the cool air passing through said cool air inlet being normally greater than the velocity of the air passing through said hot air inlet, said dampers each being balanced on a central axis and arranged to close one of said inlets when the other is opened, means to operate said dampers, and a supplemental damper blade mounted on each face of the cool air inlet damper adjacent and parallel with the axis thereof, said supplemental blades being each in a plane intersecting the plane of said cool air damper and adjustable to vary the angle of intersection of said planes.

12. A pair of mixing dampers interconnected for simultaneous operation and arranged to control respectively a warm air inlet and a cool air inlet of a common duct, the velocity of the cool air passing through said cool air inlet being normally greater than the velocity of the air passing through said hot air inlet, said dampers each being balanced on a central axis and arranged to close one of said inlets when the other is opened, means to operate said dampers, and a supplemental damper blade mounted on each face of the cool air inlet damper adjacent and parallel with the axis thereof, said supplemental blades being each in a plane intersecting the plane of said cool air damper, and a wing member on each side edge of the supplemental blade mounted on the outer face of said cool air damper and extending toward the respectively adjacent side edge of the cool air damper which moves into said common duct when said cool air damper opens.

THOMAS J. BRETT.
EDWARD A. GIBBONS.